United States Patent [19]

Millerd et al.

[11] Patent Number: 4,942,349
[45] Date of Patent: Jul. 17, 1990

[54] CONTROL SYSTEM FOR OPERATING A WINDOW WIPER IN RESPONSE TO WATER MOISTURE

[76] Inventors: Donald L. Millerd, 850 Plaza Toluca, San Diego, Calif. 92114; Marl J. Bell, 29852 Quail Hollow La., Valley Center, Calif. 92082; Robert S. Alpert, 2227 Summerhill Dr., Encinitas, Calif. 00000

[21] Appl. No.: 258,159

[22] Filed: Oct. 14, 1988

[51] Int. Cl.$^5$ .............................................. H02P 3/00
[52] U.S. Cl. .............................. 318/483; 318/DIG. 2; 15/250.13
[58] Field of Search ............... 318/480, 483, 443, 444, 318/DIG. 2; 15/250 C, 250.17, 250.12

[56] References Cited

U.S. PATENT DOCUMENTS

| | | | |
|---|---|---|---|
| 3,786,330 | 1/1974 | Inoue et al. | 318/483 |
| 3,794,847 | 2/1974 | Cacliou | 15/250 C |
| 4,127,763 | 11/1978 | Roselli | 15/250 C |
| 4,389,603 | 6/1983 | Kogawa et al. | 318/443 |
| 4,476,419 | 10/1984 | Fukatsu et al. | 318/444 |
| 4,527,105 | 7/1985 | Shiraishi | 318/DIG. 2 |
| 4,595,866 | 6/1986 | Fukatsu et al. | 318/DIG. 2 |
| 4,665,351 | 5/1987 | Nyberg | 15/250 C |
| 4,703,237 | 10/1987 | Hochstein | 15/250 C |
| 4,705,998 | 11/1987 | Millerd et al. | 318/483 |

FOREIGN PATENT DOCUMENTS 2057062 5/1972 Fed. Rep. of Germany .... 15/250 C

Primary Examiner—William M. Shoop, Jr.
Assistant Examiner—A. Jonathan Wysocki
Attorney, Agent, or Firm—Karl F. Milde, Jr.

[57] ABSTRACT

An automatic control system for operating an electrically actuated device, such as a windshield wiper, power window, sun roof or convertible top of a motor vehicle, in response to the presence of water moisture. The control system includes a moisture sensor having a plurality of spaced apart, exposed conductive strips, the strips being arranged in adjacent pairs; a voltage source coupled to one strip of each pair; a current detector coupled to the other strip of each pair to discriminate between the presence or absence of moisture droplets on each pair; a drop accumulation detector, coupled to the current detector, for determining the number of pairs of sensor strips which are contacted by moisture droplets; and an electrical switch, coupled to the droplet detector, for switching on the electrical device in response to the number of droplets present on the moisture sensor.

13 Claims, 15 Drawing Sheets

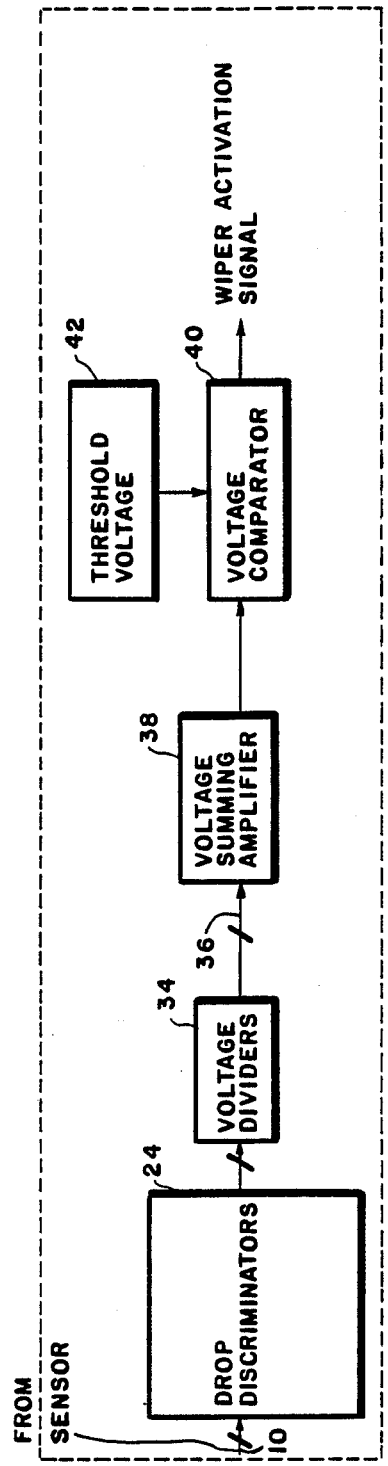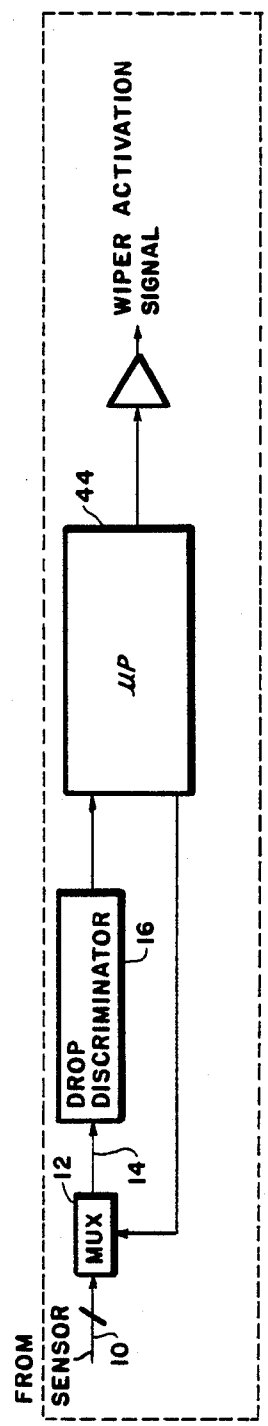

CONTROL SYSTEM FOR OPERATING A WINDOW WIPER IN RESPONSE TO WATER MOISTURE

CROSS REFERENCE TO RELATED PATENTS AND PATENT APPLICATIONS

The subject matter of this application is related to that disclosed and claimed in the U.S. Pat. No. 4,705,998 of Donald L. Millerd and Marl J. Bell entitled "AUTOMATIC WINDOW WIPER CONTROL" which patent is now the subject of reissue application Ser. No. 175,041 filed Mar. 29, 1988. The subject matter of this application is also related to that disclosed and claimed in the U.S. patent application Ser. No. 221,866 filed July 20, 1988 by Donald L. Millerd, and Marl J. Bell entitled "MOISTURE SENSOR" now U.S. Pat. No. 4,897,585.

BACKGROUND OF THE INVENTION

The present invention relates to an automatic control system for operating an electrically actuated device in response to the presence of water moisture. A specific, preferred application of the present invention is to operate a window wiper, such as a windshield wiper for a motor vehicle, in response to the presence of water moisture on the windshield. Other applications of the invention include the automatic closing of one or more power windows, a sun roof or a convertible top of a motor vehicle in response to the presence of water moisture on the vehicle.

The aforementioned U.S. Pat. No. 4,705,988 relates to an automatic window wiper control which employs, as a moisture sensor, a plurality of spaced apart, exposed conductive strips. These strips, which are preferably both linear and parallel, are positioned on a motor vehicle windshield so as to encounter, and be cleaned by a window wiper blade during its normal to and fro sweep. Connected to the moisture sensor is an electronic control circuit which converts the moisture level on successive pairs of sensor strips to a DC voltage. When the DC voltage exceeds a first threshold level, the windshield wiper motor is switched on at its normal speed. When the DC voltage exceeds a second, higher threshold level, the windshield wiper motor is caused to operate at its high speed. When the DC voltage falls below the lower threshold, the control circuit switches off the wiper motor. If the wiper motor is switched off during a wiper sweep, as is oormally the case, the normal homing circuit of the wiper motor continues to operate the motor until the wiper blade or blades reach the wiper blade home position.

While the control system disclosed in the U.S. Pat. No. 4,705,998 operates satisfactorily to detect moisture and control the wiper motor accordingly, there are instances when the moisture detection circuit does not accurately reflect the moisture condition of the windshield. For example, if one of the plurality of pairs of conductive strips of the moisture sensor are effectively "shorted" together by a single moisture droplet containing a high level of impurities, the windshield wiper will be caused to actuate even though only few moisture droplets are present on the windshield. Conversely, if exceedingly "clean" rain falls on the moisture sensor so that the resistance between the pairs of conductive strips remains high, notwithstanding the presence of substantial moisture, the control circuit will not detect the presence of such moisture and will therefore not switch on the wiper motor.

The aforementioned U.S. Pat. No. 4,705,998 discloses a moisture sensor comprising "printed circuit" type conductive strips. Since this moisture sensor is positioned where it can be wiped by the windshield wiper, it is located in the normal field of view of the driver. The aforementioned U.S. patent application Ser. No. 221,866 discloses various configurations of a moisture sensor of this type which can be located out of the normal field of view of the driver swept by the windshield wiper. In this case, however, separate means are provided for repetitively removing the moisture from the exposed surface of the moisture sensor in synchronism with the movement of the window wiper. This moisture sensor has the disadvantage of requiring a separate mechanism which not only increases the cost of the device but is subject to problems of reliability.

SUMMARY OF THE INVENTION

It is a general object of the present invention to provide a control system for operating an electrically actuated device, such as a windshield wiper a power window, a sun roof or a convertible top of a motor vehicle, in response to the presence of water moisture, which control system overcomes the disadvantages of the prior systems described above.

It is a more particular object of the present invention to provide a control system of the above-described type which can discriminate and count individual water droplets which are deposited on a moisture sensor.

It is still another object of the present invention to provide a control system of the above-described type which is capable of sensing the presence of water droplets on a moisture sensor, notwithstanding variations in the electrical resistance of the water.

It is a still further object of the present invention to provide a moisture sensor for a control system of the above-described type which can be, and is attached to a substrate, such as a glass window or windshield, in such a way as to be permanent and not subject to removal.

It is a further object of the present invention to provide a moisture sensor for a control system of the above described type which can be arranged on a clear glass window or windshield without obstructing the view through the window or windshield.

These objects, as well as further objects which will become apparent from the discussion that follows, are achieved, according to the present invention, by providing a control system which comprises a current detector, coupled to receive the current flow through each pair of sensor strips, either successively or in parallel, to discriminate between the presence or absence of moisture droplets on each pair of strips; a drop accumulation detector, coupled to the current detector, for determining the number of pairs of sensor strips which are contacted by moisture droplets; and switch means, coupled to the droplet detector, for switching on an electrically actuated device in response to the number of droplets present on the moisture sensor.

The current detector can either be a single current threshold device which is successively connected to individual pairs of conductive strips of the moisture sensor by means of a multiplexor, or it may comprise a plurality of detectors, each coupled to a single one of the pairs. In either case, the current detector determines whether moisture between two adjacent sensor strips causes current flow, from one strip to the other, which exceeds a first prescribed threshold.

In a preferred embodiment of the present invention, the device for determining the number of pairs of adjacent sensor strips for which the current flow exceeds the first prescribed threshold comprises a drop accumulation counter which makes a binary count of the number of pairs of sensor strips for which the current flow through each pair exceeds the first prescribed threshold. This count is then compared with a second prescribed threshold to determine the number of droplets on the moisture sensor at any given time. If the number of droplets exceeds this second threshold, remedial action, such as switching on a window wiper, closing windows, closing a sun roof or a convertible top, is taken. This second threshold, which determines the action to be taken, may, in fact, be divided into a plurality of thresholds, for example a first, lower threshold in which a windshield wiper is turned on at a slow speed, and a second, higher threshold in which the windshield wiper is turned on at a higher speed.

According to another feature of the present invention, a moisture sensor is provided for operating a wiper system for a transparent, preferably glass window. The sensor comprises a plurality of spaced apart, conductive strips disposed on the surface of the window. The strips are made of a clear conductive "thin film" which has been deposited on the window by chemical vapor deposition, or some other deposition technique such as spraying or sputtering with a thickness in the order of up to 4,000 Angstroms. This film is either deposited through a mask to create the individual sensor strips or is first deposited in a localized area and then etched away to form the sensor strip pattern.

A tin oxide film ($SnO_2$:F) is preferably used to form the moisture sensor. This film is transparent, highly conductive and resistant to abrasion and removal from the window substrate. Tin oxide can be deposited via chemical vapor deposition through a mask.

Indium tin oxide can also be used to provide transparent, conductive strips. In this case, the composition is deposited by sputtering onto a localized area of the window and then subsequently selectively etching t form the sensor pattern.

For a full understanding of the present invention, reference should now be made to the following detailed description of the preferred embodiments of the invention and to the accompanying drawings.

BRIEF DESCRIPTION OF THE DRAWINGS

FIGS. 1A, 1B, 1C and 1D are functional block diagrams of four alternative embodiments of the present invention.

DESCRIPTION OF THE PREFERRED EMBODIMENTS

Figure 1A:
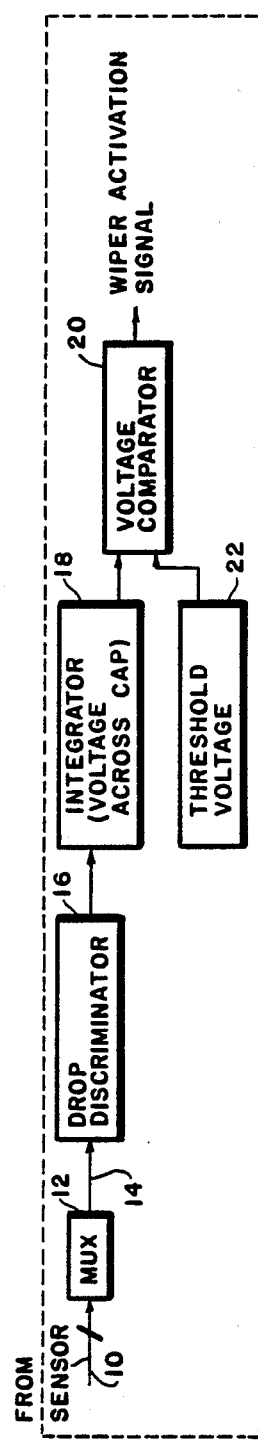

The preferred embodiments of the present invention will now be described with reference to FIGS. 1-9 of the drawings. Corresponding elements in the various figures are provided with the same reference numerals.

FIGS. 1A, 1B, 1C and 1D show four different, alternative embodiments of the present invention, all of which operate in accordance with the principals of the present invention to discriminate individual raindrops and actuate a device, such as a windshield wiper, a power window, a sun roof or a convertible top of a motor vehicle, when the number of raindrops which have fallen on a moisture sensor exceeds a prescribed threshold.

Figure 10:
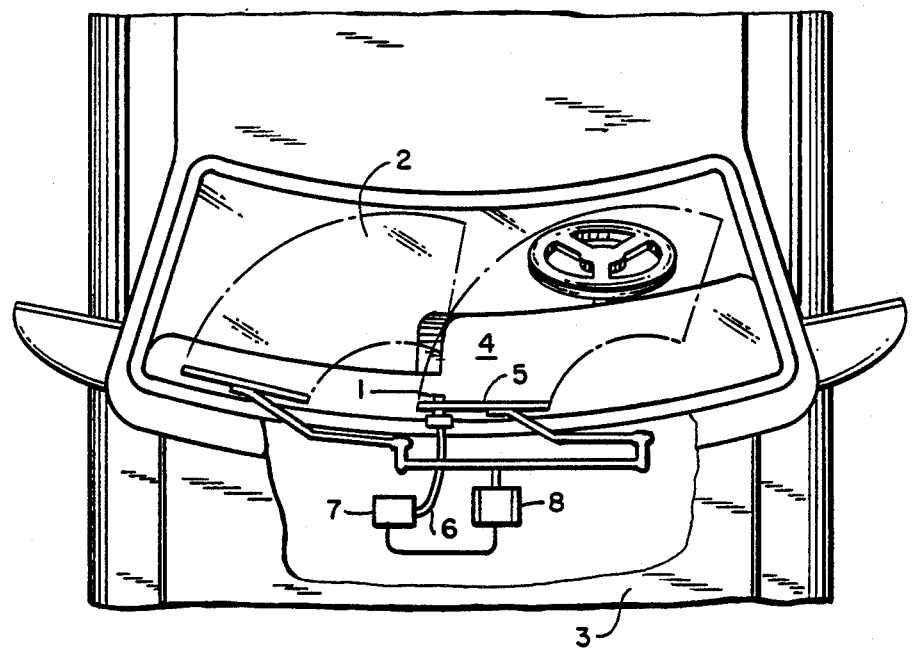
FIG. 10 is a top plan view of an automotive vehicle in partial cutaway showing the basic elements of the present invention.
Figure 11:
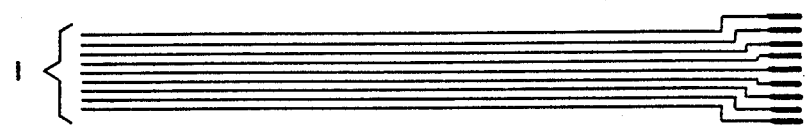
FIG. 11 is a plan view of a moisture sensor employed with the present invention.

As shown and described in the aforementioned U.S. Pat. No. 4,705,998 in connection with FIGS. 2 and 4, and illustrated in FIGS. 10 and 11, the moisture sensor 1 comprises a plurality of side-by-side positioned, exposed conductive strips arranged on a glass substrate such as a windshield 2 of a motor vehicle 3 in the wiping region 4 of a windshield wiper 5. The strips are individually connected via wires 6 to an electronic wiper control system 7. This control system is connected to, and operative to control, the windshield wiper motor 8. In the control system 7, successive pairs of these strips are connected, e.g. through a multiplexer, such that one element (strip) of each pair is connected to a voltage source (such as a 12 volt battery) and the other is connected to a control circuit to be described hereinafter.

Referring to FIG. 1A, the plural signals received from the sensor strip pairs on plural lines 10 are passed successively through a multiplexer 12 to a single line 14 and applied to a drop discriminator 16. This discriminator is a "Schmitt trigger" circuit which produces a prescribed voltage output, representing a logical "1" or "0" depending upon the convention used, if and only if the signal on line 14 exceeds a prescribed threshold. The output of the discriminator is passed to an integrator/filter circuit 18 which produces an output voltage representative of the rate at which the Schmitt trigger 16 produces a "1" output. The output voltage of the integrator 18 is passed to a comparator circuit 20 which produces an output signal that activates a device, such as a windshield wiper motor, when this voltage exceeds a adjustable threshold voltage 22.

Figure 1B:
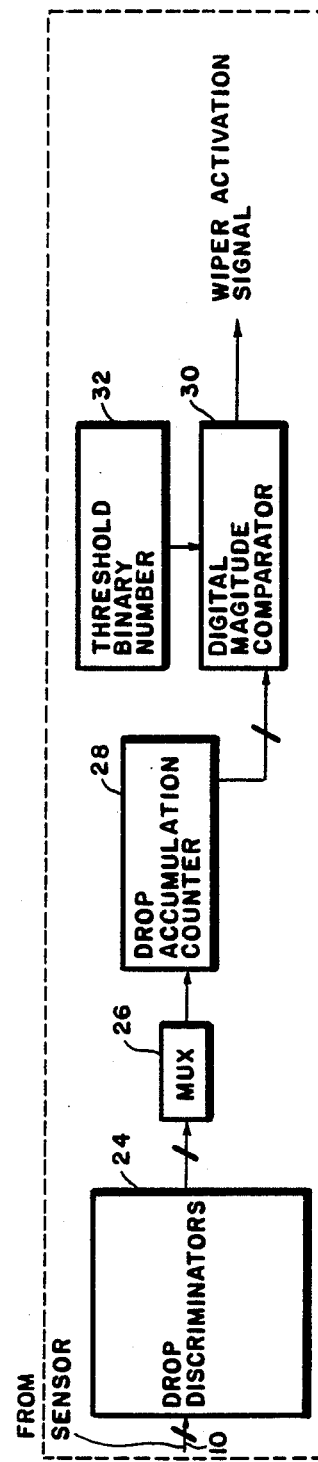

Referring to FIG. 1B, this embodiment includes a plurality of drop discriminators 24, each connected to one of the sensor outputs on plural lines 10. The outputs of the drop discriminators (Schmitt triggers), each representing a logical "1" or "0", are applied in parallel to a multiplexer 26, which serializes the signals and applies them successively to a drop accumulation counter 28. A digital comparator 30 periodically compares the count appearing in the counter 28 with an adjustable binary threshold number 32. If the count exceeds the threshold number, the comparator produces an output signal to activate an electrical device.

Referring to FIG. 1C, this embodiment includes a plurality of parallel drop discriminators 24 which receive plural signals from the sensor on lines 10. The output of each drop discriminator is divided down by voltage dividers 34 so that each output that occurs produces a prescribed, small voltage on one of the output lines 36. The output lines 36 are applied to a voltage summing amplifier 38 which produces an output signal proportional to the sum of the individual voltages applied at its input. The output of the summing amplifier 38 is applied to a voltage comparator 40 which compares this voltage to an adjustable threshold voltage 42. If the output of the summing amplifier exceeds the threshold voltage, the comparator produces an output signal to activate an electrical device.

FIG. 1D shows how a microprocessor 44 may be used to implement the control circuit according to the invention. This microprocessor controls the multiplexer 12 and synchronously senses the output of the drop discriminator 16. The microprocessor counts the "1" outputs of the drop discriminator over a prescribed period of time and produces an output signal when the drop rate exceeds a prescribed threshold. This output signal is amplified and supplied as an activation signal to an electrical device.

The essential elements of FIGS. 1A, 1B, 1C and 1D are illustrated in detail in FIGS. 2, 3, 4 and 5, respectively.

Figure 2:
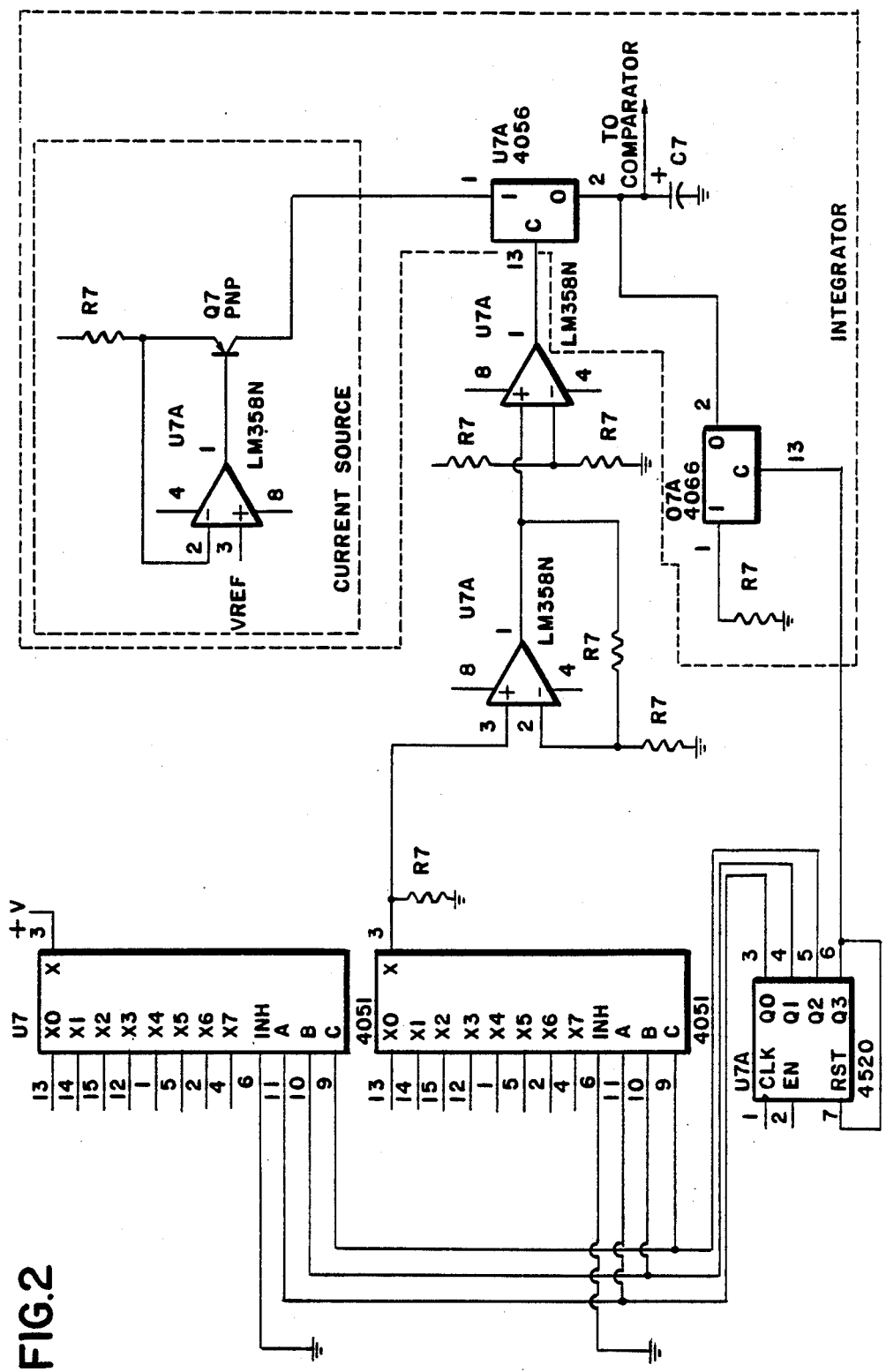
FIG. 2 is a schematic diagram showing the essential elements of the embodiment of FIG. 1A.

The circuit of FIGS. 1A and 2 are comprised of analog circuit elements. The capacitor in the integrator 18 is either charged by the output of the drop discriminator or is allowed to decay, depending on whether or not a drop is present on the selected multiplexer channel. A water drop, present on a multiplexer channel causes the voltage across the capacitor to "ramp up" during the time that the multiplexer channel is on. When a multiplexer channel without water is selected, the capacitor is disconnected from the current source within the drop discriminator and thereby retains any previous voltage charge. After all the multiplexer channels have been successively selected, a voltage, representing the number of drops bridging the sensor pairs, appears across the output of the integrator stage 18.

As a voltage, this output can be compared to a voltage representing a quantity (threshold) of precipitation. When this voltage is exceeded, a device activation signal is produced. After this comparison has been made, the capacitor is quickly discharged so that the cycle can be repeated.

Figure 3:
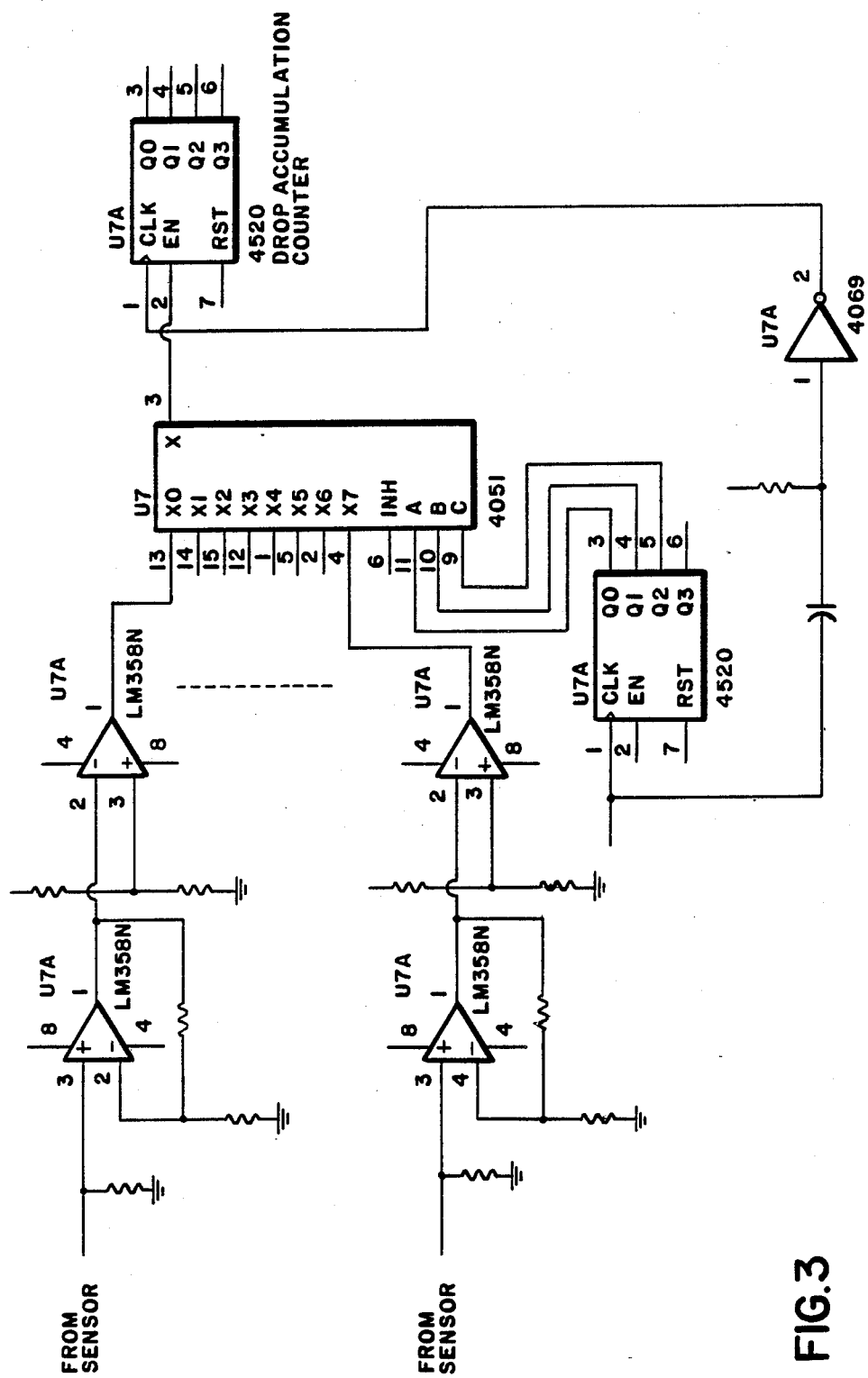
FIG. 3 is a schematic diagram showing the essential elements of the embodiment of FIG. 1B.

Referring to the circuit of FIGS. 1B and 3, it will be understood that where, in FIG. 1A, a voltage is accumulated to represent moisture, in FIG. 1B moisture is represented by a binary number which is "accumulated". In this embodiment, the output of the sensor is not multiplexed. Instead, a stage consisting of an amplifier and a comparator are duplicated several times as is shown in FIG. 3. The multiplexing and counting are done after the amplification and comparison.

Figure 4:
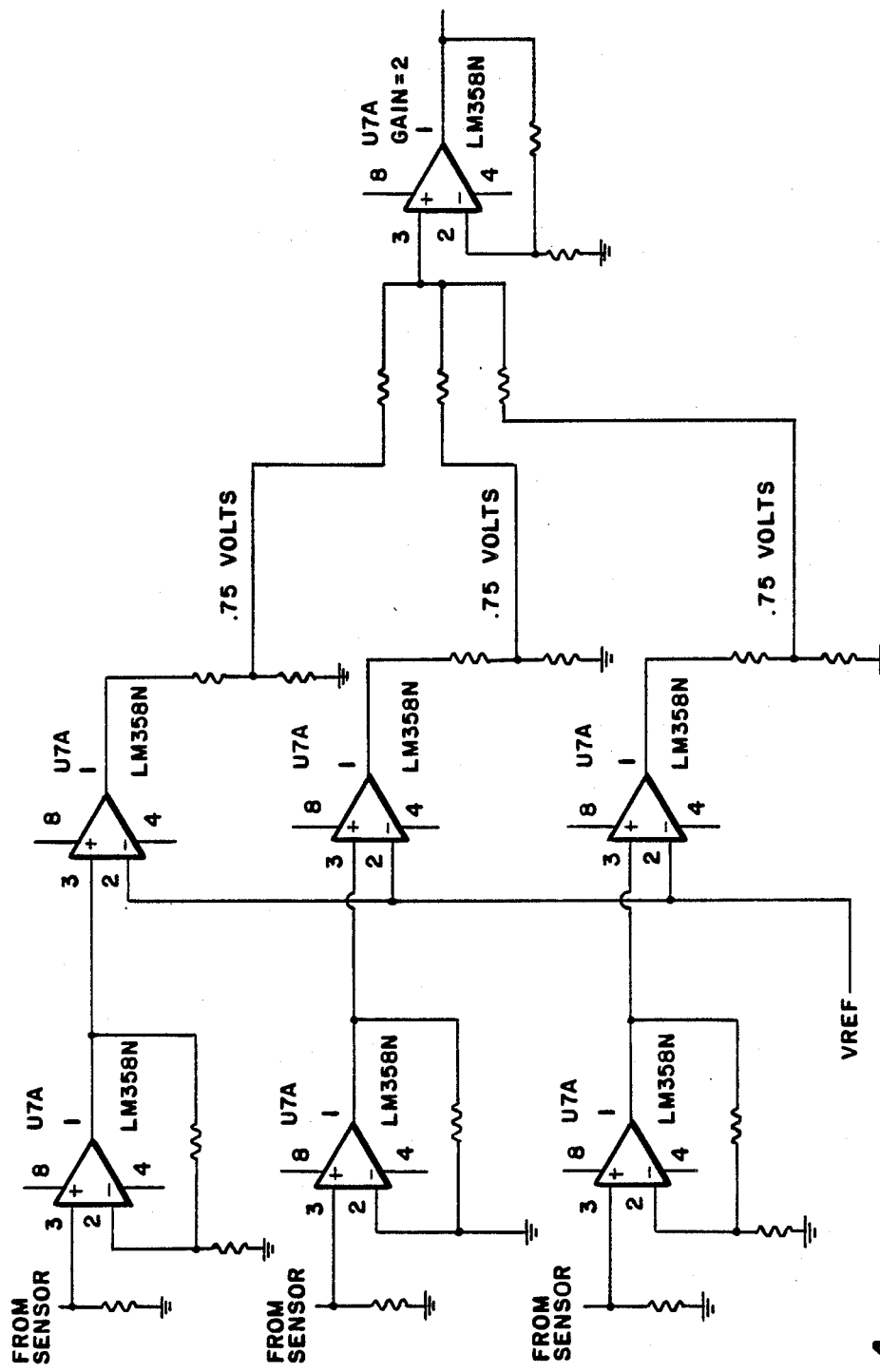
FIG. 4 is a schematic diagram showing the essential elements of the embodiment of FIG. 1C.

Multiplexing can be eliminated entirely by summing the voltage divided output of several comparators, as shown in FIG. 1C and FIG. 4. The voltage output of the summing amplifier is compared with a quantity (threshold) as described previously.

Figure 5A:
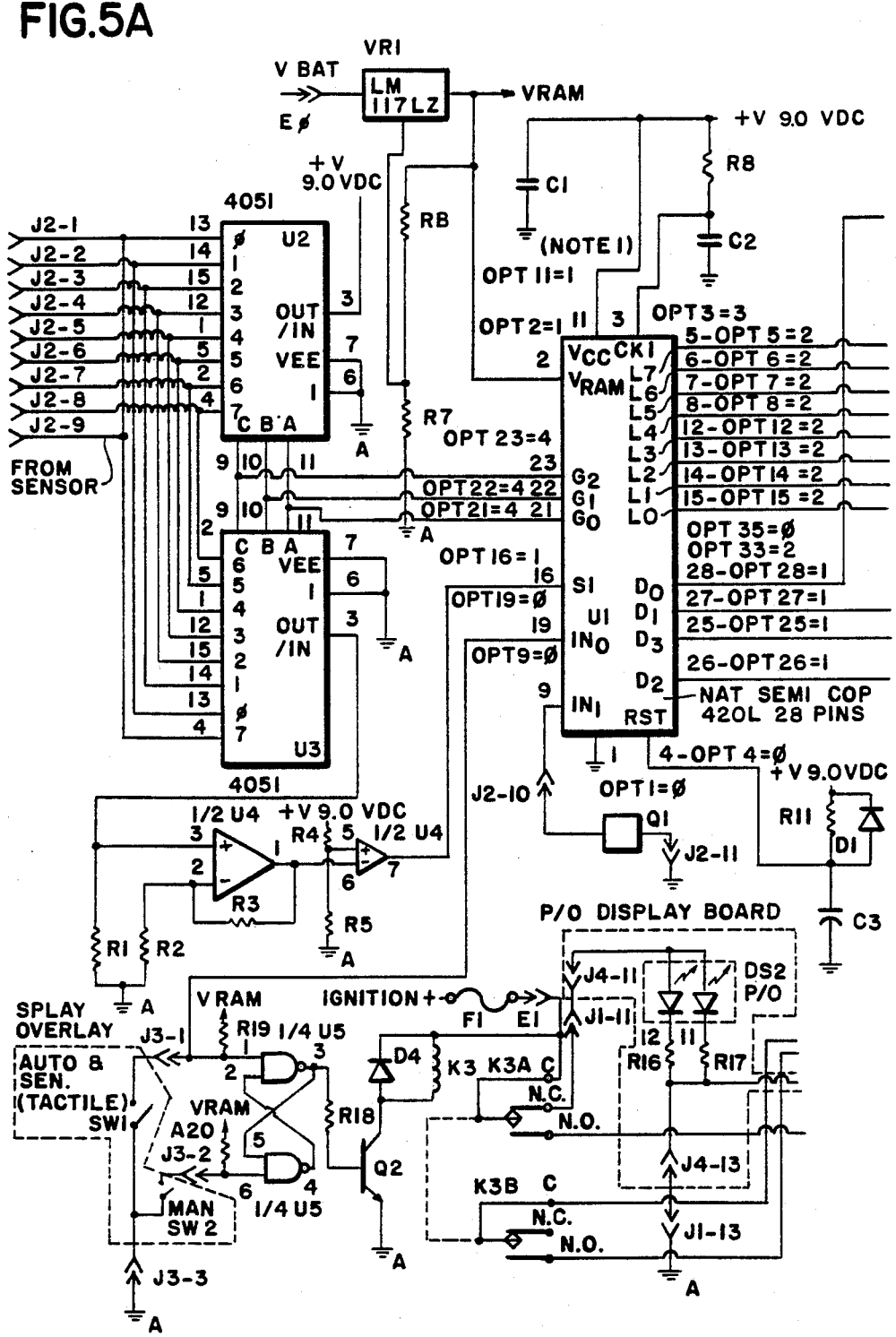
FIG. 5 is a schematic diagram showing the essential elements of the embodiment of FIG. 1D FIG. 6, comprised of FIGS. 6A and 6B, is a block diagram of a complete wiper control system according to the present invention.
Figure 5B:
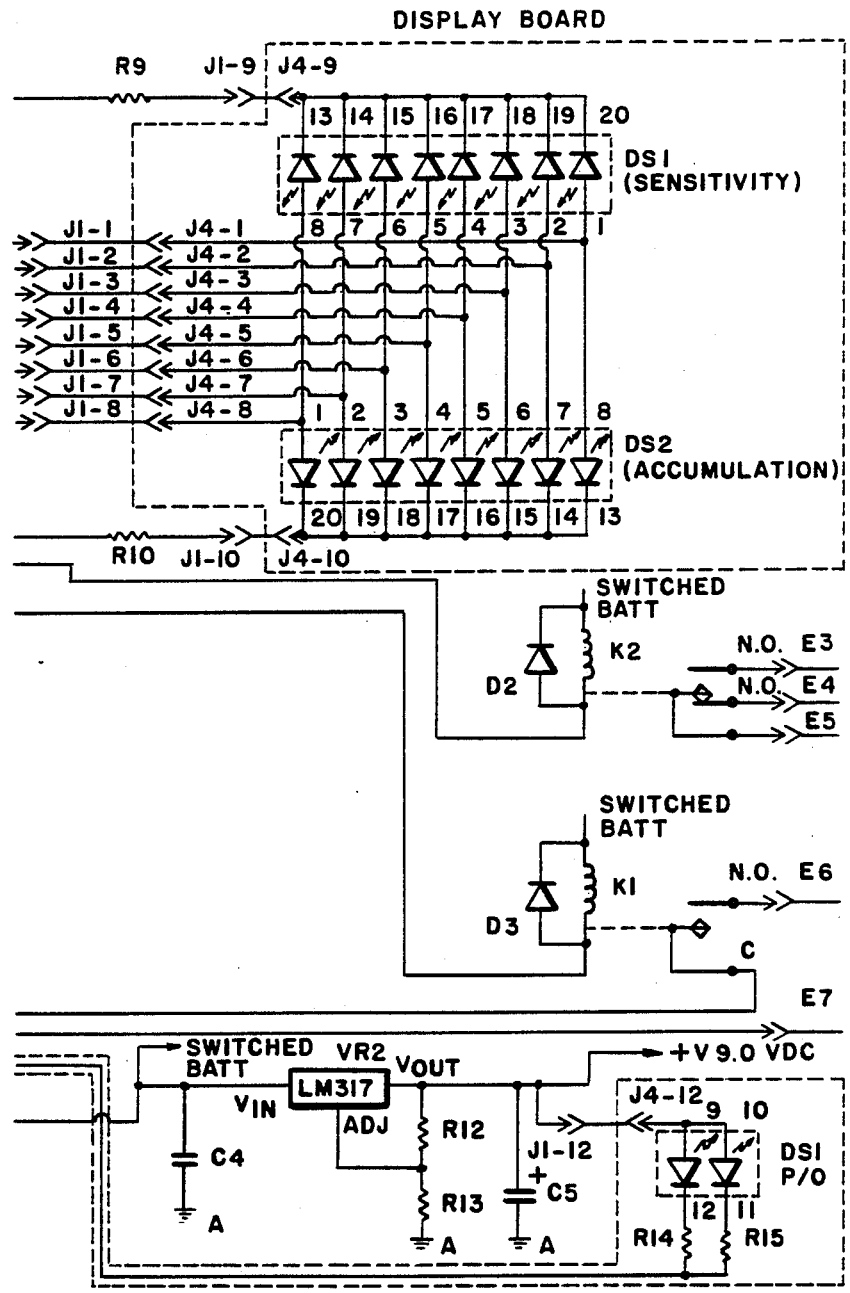

The most flexible approach, but probably the most expensive, is shown in FIGS. 1D and 5. In this case, the microprocessor may be programmed in accordance with any desired algorithm to optimize the operation of the circuit and avoid false alarms.

Figure 6A:
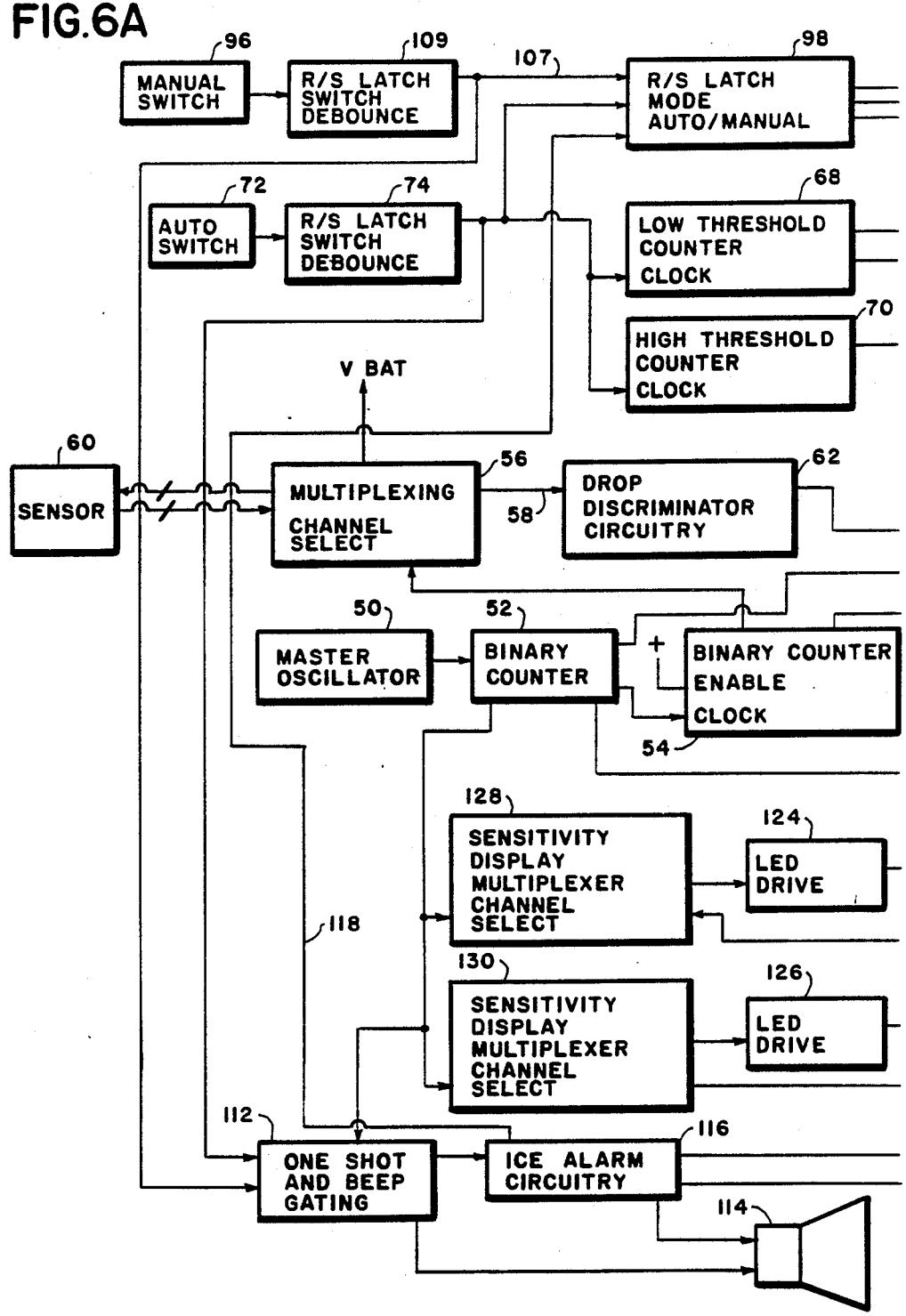
Figure 6B:
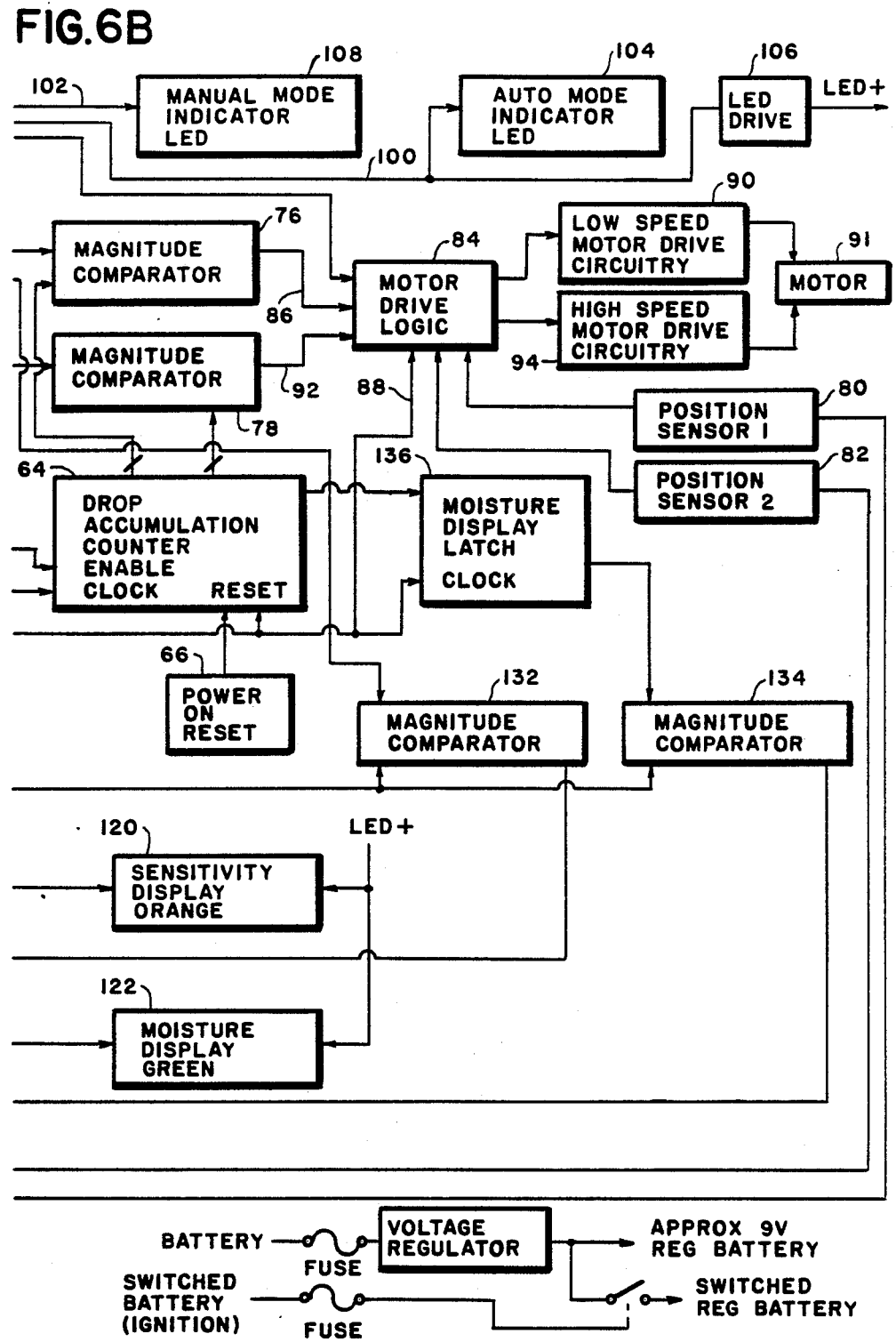

FIG. 6, which is comprised of FIGS. 6A and 6B, shows an entire control system for a motor vehicle windshield wiper. This system utilizes a single drop discriminator as in FIG. 1A; however, the circuit which follows the drop discriminator is similar to that of FIG. 1B. With the exception of the analog multiplexers and the Schmitt trigger employed as a drop discriminator, this circuit is comprised of purely digital logic elements.

Binary numbers stored in counters are used to represent precipitation accumulation. Binary numbers also represent a quantity (threshold) of precipitation that, when exceeded, produces a wiper activation signal.

The following is detailed description of this system.

The master oscillator 50 provides a timing for nearly all of the controller's circuitry. The square wave output is approximately 2 KHz. The master oscillator clocks a binary counter 52. Since the output of the binary counter divides the master oscillator frequency in half five times, the frequency at its output is 62.5 Hz. This 62.5 Hz. signal is used to clock binary counter 54 at its clock input.

The binary outputs of counter 54 connect to the channel select inputs of two analog multiplexers 56. The analog multiplexers each have eight channels and can be individually selected depending on the binary number that is applied to their channel select inputs.

As each channel is selected, an electrical path is made between the single multiplexer output line 58 and the selected channel to the sensor 60. Assuming that channel "0" has been selected on both multiplexers, current can flow from the battery VBAT through one multiplexer to the sensor 60, through a raindrop (if present on a pair of sensor strips), through the second multiplexer to the line 58. Because of the way the multiplexers are interconnected at their inputs, successive channel selection causes successive adjacent pairs of sensor strips to be "scanned". As these adjacent sensor strips are scanned, the rain signal for each pair appears as a voltage on the output line 58. This output line is connected to a drop discriminator circuit 62.

The voltage on line 58 is amplified by an amplifier within the discriminator 62, the gain of which is approximately equal to 356. After the voltage has been amplified, it is compared against a fixed threshold voltage formed by a resister divider network comprising a pair of resisters connected in series to the battery voltage VBAT. Since the voltage VBAT of approximately 9 volts is divided in half, the threshold voltage is approximately 4.5 volts.

If the voltage from the output of the amplifier is more positive than the threshold voltage, the output of the drop discriminator 62 switches to ground (or a value close to ground, depending upon the choice of integrated circuits). Conversely, if the output of the amplifier is less positive than the threshold voltage, the output of the discriminator 62 switches to a voltage close to its positive supply VBAT.

Thus, the output of the drop discriminator 62 produces a digital signal which either enables or disables a drop accumulater counter 64. This signal is a logical "0" when rain is present on a pair of adjacent sensor strips, and is a logical "1" when rain is not present on a pair of adjacent sensor strips.

Preferably, the raindrop threshold resistance through a pair of adjacent sensor strips is approximately 21 megohms; that is to say, a raindrop with a resistance of less than 21 megohms is determined to be a raindrop, and anything higher in resistance than 21 megohms is determined not to be a raindrop.

When a logical "0" is present on the enable input of the drop accumulation counter 62, and a "1" to "0" logic transition occurs at its clock input, this counter is incremented by one count. Assume, for example, that there are two drops bridging two pairs of sensor strips. The drop accumulation counter 62 will then be enabled to count twice before its receives a reset pulse at its reset input. The binary number present at the plural outputs of this counter, after all eight channels of the multiplexers have been selected, is the number of drops bridging adjacent pairs on the sensor.

The reset pulse applied to the reset input of the drop accumulation counter 64 is generated after every eight clock pulses by the binary counter 54. The accumulation counter can also be reset by "power on reset" circuitry 66. This reset is only generated when the control circuit is initially connected to power.

To determine whether or not a certain number of drops bridging pairs of adjacent sensor strips will initiate a windshield wiper stroke, the binary number present at the outputs of the drop accumulation counter 64 must be compared with some preset number of drops. This preset number is provided by one or more registers or counters as will now be described.

In this example, low and high threshold counters 68 and 70, respectively are employed to provide two preset numbers. The low threshold counter supplies the binary, numerical value that determines how many drops can bridge pairs of adjacent sensor strips before a wiper stroke is initiated. The high threshold counter supplies the binary numerical value that determines how many drops can bridge pairs of adjacent sensor strips before high speed wiper stroking is initiated.

The threshold counters are pressettable, up-down counters. Both counters are set to count only down. Each time the "automatic" button 72 is pushed, a positive-going clock edge is generated that causes the threshold counters to count down one count. When a binary numerical value of zero is reached on the low threshold counter, a carry-out is generated. Both counters are preset-enabled, which means that both counters are preset to the binary numerical values that are "hard-wired" at their inputs. Counter 68 is wired to be preset to a binary value of 1000 (Decimal 8) and counter 70 is wired to be preset to a binary value of 1001 (Decimal 9).

When the counters are clocked by pushing the "AUTO" switch 72, the counters will count down from these new numbers (8 Decimal) and (9 Decimal).

"Switch Bounce" is removed by means of a nand gate latch 74. This prevents the counters from being clocked more than once each time the "AUTO" switch is pushed. A counting sequence is shown below:

| NUMBER OF PUSHES | LOW THRESHOLD COUNTER | HIGH THRESHOLD COUNTER |
| --- | --- | --- |
| 1 | PRESET ENABLE | PRESET ENABLE |
| 2 | 8 | 9 |
| 3 | 7 | 8 |
| 4 | 6 | 7 |
| 5 | 5 | 6 |
| 6 | 4 | 5 |
| 7 | 3 | 4 |
| 8 | 2 | 3 |
| 9 | 1 | 2 |
| 10 | 0 | PRESET ENABLE |
|  | 8 | 9 |
| 11 | 7 | 8 |

Zero is present for a few nanoseconds because a count of zero is what causes a preset enable.

After a low and high threshold is established in the counters 68 and 70, and a binary number representing drops bridging pairs of adjacent sensor strips is stored in the drop accumulation counter 64, a magnitude comparison must be carried out in order to determine whether or not wipers should turn on and, if so, whether or not high speed operation should begin.

The comparator 76 compares the binary number stored in the drop accumulation counter 64 with the number stored in the low threshold counter 68. If the number in the drop accumulation counter is less than the number in the low threshold counter, the output of magnitude comparator will be a logic "0". Conversely, if the number in the drop accumulation counter is greater than the number in the low threshold counter, the output of the magnitude comparator will be a logic "1". Therefore, a logic "1" at the output of comparator 76 is necessary to initiate wiping of the windshield.

The comparator 78 compares the binary number stored in the drop accumulation counter 64 with the number stored in the high threshold counter 70.

The number in the high threshold counter is always greater than the number in the low threshold counter. It is therefore necessary for this larger number to be exceeded by the drop accumulation counter to initiate high-speed wiper operation. When the number in the drop accumulation counter is greater than the number in the high threshold counter, the output of magnitude comparator 78 will be a logic "1". Therefore, a logic "1" at the output of comparator 78 is necessary to initiate high-speed wiper operation.

A dual "D" type flip-flop, two nand gates along with wiper position sensor inputs 80 and 82 make up the motor drive logic 84.

Whenever a logical "1" is present at the data input 86 of the flip-flop and a transition from a logical "0" to a logical "1" occurs at the clock input 88, the logical "1" present at the data input is "clocked" over to the Q output. This logic "1", through a resistor, causes an NPN transistor to conduct, thereby completing the ground path of a relay coil. The contacts of the relay close, thereby supplying current to the low speed winding 90 of the wiper motor 91.

Similarly, when a "1" is present at the data input 92, and a transition from "0" to "1" occurs at the clock input 88, the "1" present at input 92 is clocked over to the Q output of the flip-flop. This "1" causes the transistor 94 to conduct, thereby completing the ground path of another relay coil. The contacts of this relay close, thereby supplying current to the high-speed winding 94 of the wiper motor 91.

As the wiper blades move across the windshield, water accumulates and is pushed along. The wiper blade that wipes across the sensor will, at some point during its sweep, be directly on top of the sensor. At this time, the accumulated water that is being pushed along, momentarily bridges across all the pairs of adjacent sensor strips.

The purpose of wiper position sensor 82 is to ensure that this condition does not erroneously re-initiate a wiper cycle. When the wiper blade is on top of the sensor, wiper position sensor 82 will output a logical "0". This prevents any logic state changes from occurring while this aforementioned condition exists.

There are other approaches to solving this problem. One way is to slow down the rate at which the multiplexer channels are selected, so that even if all the sensor strips are bridged by accumulated water, the wiper blade will not be on top of the sensor long enough for the drop accumulation counter to count to a high enough number so as to re-initiate a wiper stroke. Another approach is to slow the rise-time of the data that is being clocked into the flip-flop of the motor drive logic with an RC time constant. Both of these methods, however, preclude instantaneous operation. Therefore, wiper position sensor 2 provides for very rapid response to precipitation.

The wiper position sensor 80 prevents the wipers from stopping at a slightly elevated position. During continuous operation, the park switch within the wiper motor is closed and therefore no wiper position information is available to the circuitry. The circuitry must "know" this information for continuous operation because, when rainy conditions subside and the circuitry terminates operation, there is a possibility that the wipers are just beginning a new stroke when the circuitry terminates operation. This may leave the wipers partially elevated, possibly obscuring the drivers' view. Even though the wipers are elevated, it is quite possible for them to not be high enough to close the park switch within the wiper motor which, if closed, would carry the wipers through another complete cycle and come to rest at the bottom of the windshield. Once wiper operation has been initiated, the only time the circuitry can cause wiper operation to terminate is when wiper position sensor 80 produces a signal (which is at the top of the wiper stroke).

In this design, both position sensors are SPRAGUE Hall-effect switches, part number UGN 3019T. When the magnet that is mounted at the base of the wiper arm comes within close proximity of either Hall-effect switch, electron current flows through that switch, through a corresponding pull-up resistor to VBAT. This provides a logical "0" to the associated logic.

Manual or automatic mode can be selected by pushing either the MANUAL switch 96 or AUTO switch 72. When switch 72 is pushed and released, a "0" is momentarily applied to a latch 98. This causes the latch to hold a "0" on its output line 100 and a "1" on its output line 102. The "0" causes an LED 104 to illuminate orange, indicating the unit is in automatic mode. The LED+ supply also comes through an LED driver 106 and is used to power the sensitivity and moisture accumulation displays.

When the switch 96 is pushed and released, a "0" is momentarily applied to line 107 via a switch debounce latch 109. This causes the aforementioned latch 98 to hold a "1" on line 100 and a "0" on line 102. The "0" causes an LED 108 to illuminate green, indicating the unit is in manual mode.

When manual mode is selected, a "1" is held on the output line 110 which is connected to both resets of the flip-flop in the motor drive logic 84. As long as this flip-flop is held reset, the controller cannot initiate wiper operation.

Because of the latch function provided by the device 98 the manual mode and automatic mode cannot be selected simultaneously.

When either the manual or automatic mode switch is pushed a signal is applied to a speaker circuit 112 which also receives the 2 KHz. master oscillator signal. This causes a short beep by the speaker 114.

If the controller has not initiated a wiper stroke, then output of position sensor 80 is a "0", and the reset input to a 7 stage binary counter 116 is a "1" and therefore reset. If a wiper stroke is initiated, the "1" at the output of position sensor 80 will remove the reset at counter 116. With the reset removed, the counter 116 begins to count. If it continues to count, its output will eventually switch to a "1" which will cause an ICE ALARM. This will, under normal circumstances, not happen because, at this time, the wipers are in motion. Position sensor 80 is activated once per wiper sweep and position sensor 82 is activated twice per wiper sweep. Wiper position sensors 80 and 82 are used to periodically reset the counter 116 so that the ICE ALARM is not triggered.

It can be seen that if a wiper cycle has been initiated, and the wiper arms cannot move, wiper position sensors 80 and 82 will never be reached, thus allowing binary counter to count to a binary 64 thus producing the ICE ALARM.

Most of the same circuitry is used to produce the ICE ALARM beeping sound as was used in producing the manual/auto beep.

When the ice alarm trigger is set, the auto/manual latch 98 is set to manual. As a result, a "1" is forced at the output 110 of the latch 98 which resets the motor logic in the same way as pushing the manual button 96 did.

Each display uses eight light emitting diodes. Both LED displays 120 and 122 are driven by transistor drivers 124 and 126, respectively. In the configuration shown, the sensitivity display is orange and the moisture display is green.

The sensitivity display is representation of the binary number that is stored in the low threshold counter 68. If a binary 0011 (Decimal 3) is stored in the low threshold counter, then three orange LEDS will illuminate. This means that at at least four drops bridging sensor pairs are required to initiate low speed wiper operation.

Both displays are multiplexed, so even though the LEDs may appear to be illuminating simultaneously, they are actually turning on individually and sequentially. The binary counter 52 outputs select the channels of analog multiplexers 128 and 130.

As each channel of multiplexer 128 is sequentially selected, a decision is made as to whether or not that LED should be turned on. Magnitude comparators 132 and 134 do this by comparing the binary numbers in the low threshold counter and drop accumulation counter, respectively, with the binary number that is being used to select the current channel. If the binary number in the low threshold counter exceeds the number used to select the current channel, then magnitude comparator 132 produces a "1" at its output. The "1" causes current to flow through the selected multiplexer channel, supplying base current to the transistor driver 124. This transistor conducts, causing electron current to flow from ground, through the transistor (from emitter to collector), through an LED. Refer to the following chart and assume a binary 0101 (Decimal 5) is stored in the low threshold counter:

| Multiplexer 128 (CHANNEL SELECT) | DECIMAL | MAGNITUDE COMPARATOR BINARY OUTPUT 132 | LED ON? |
| --- | --- | --- | --- |
| 0 0 0 | 0 | 1 | YES |
| 0 0 1 | 1 | 1 | YES |
| 0 1 0 | 2 | 1 | YES |
| 0 1 1 | 3 | 1 | YES |
| 1 0 0 | 4 | 1 | YES |
| 1 0 1 (5 NOT 5) | 5 | 0 | NO |
| 1 1 0 | 6 | 0 | NO |
| 1 1 1 | 7 | 0 | NO |

The number of drops bridging sensor pairs is the number of illuminated LEDS. This display works the same way as did the sensitivity display with the following differences: The binary number stored in the drop accumulation counter (not low threshold counter) determines the number of green LEDS illuminated. Since drop accumulation counter 64 is constantly counting (up to the number of drops bridging sensor strips) and then resetting, "flicker" is removed by latching the output of this counter with a 4 bit, D type register 136.

Figure 7A:
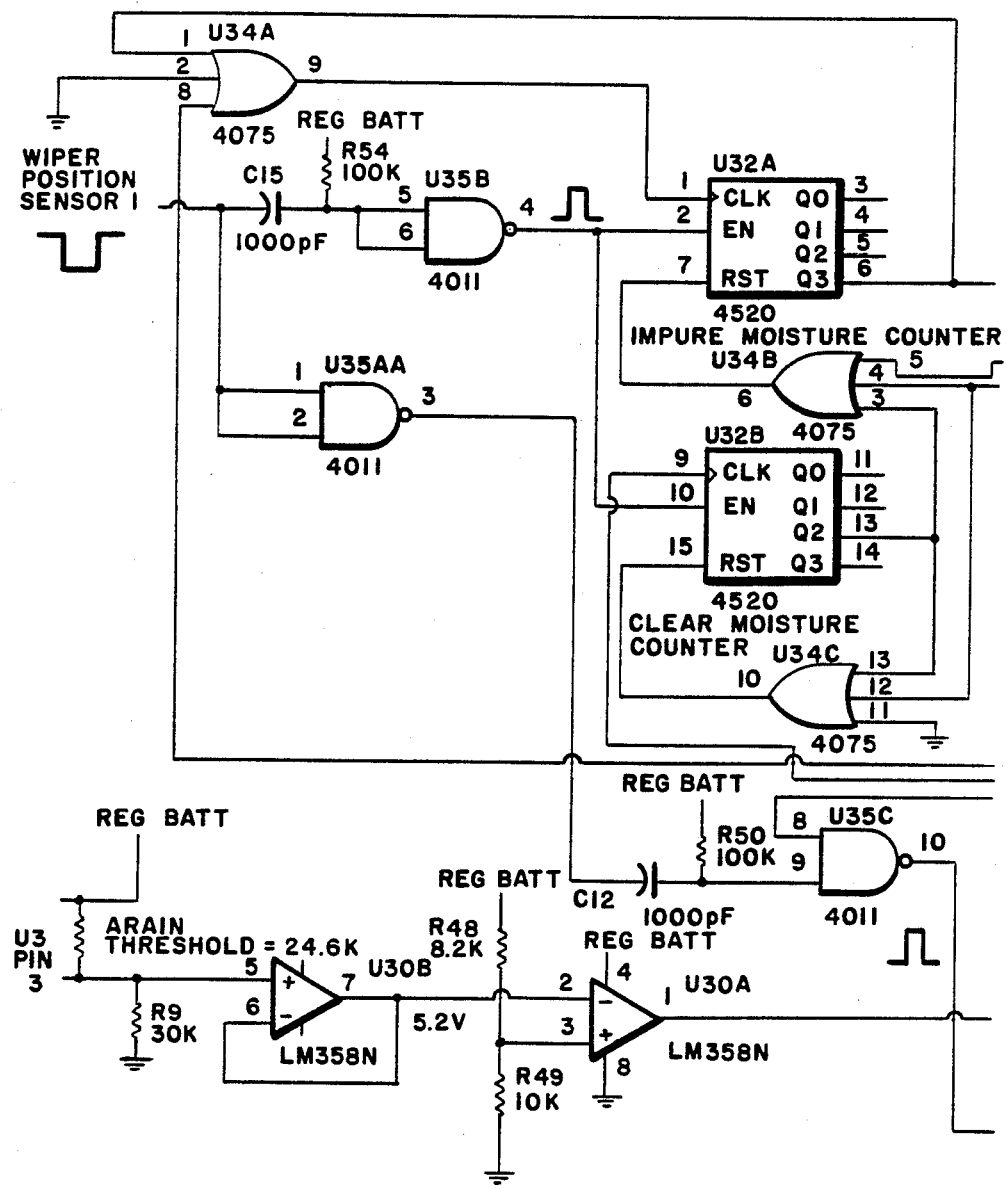
FIG. 7, comprised of FIGS. 7A and 7B, is a schematic diagram of a water impurities detection circuit which may be used with the present invention.
Figure 7B:
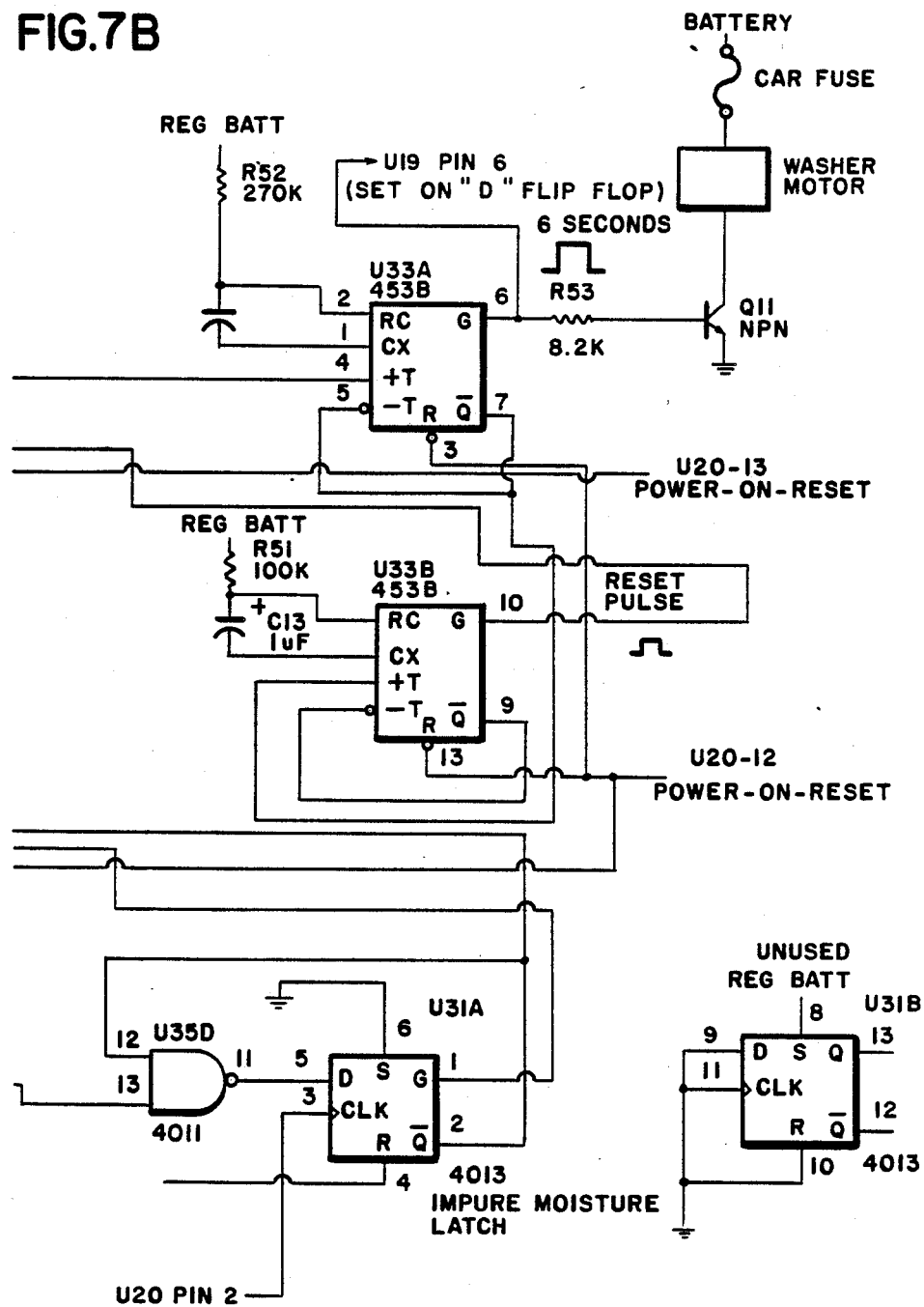
Figure 8A:
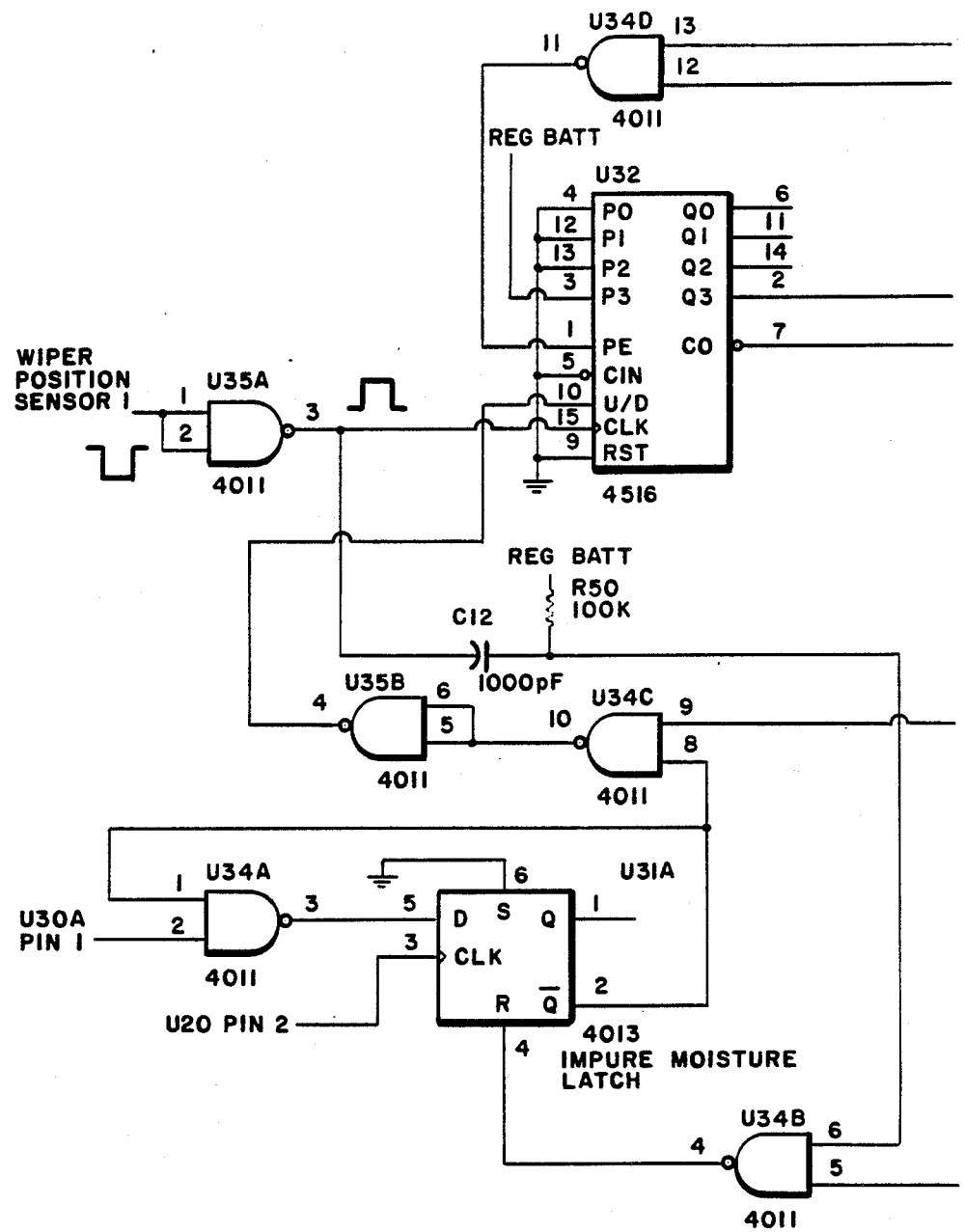
FIG. 8, comprised of FIGS. 8A and 8B, is a schematic diagram of an alternate water impurities detection circuit which may be used with the present invention.
Figure 8B:
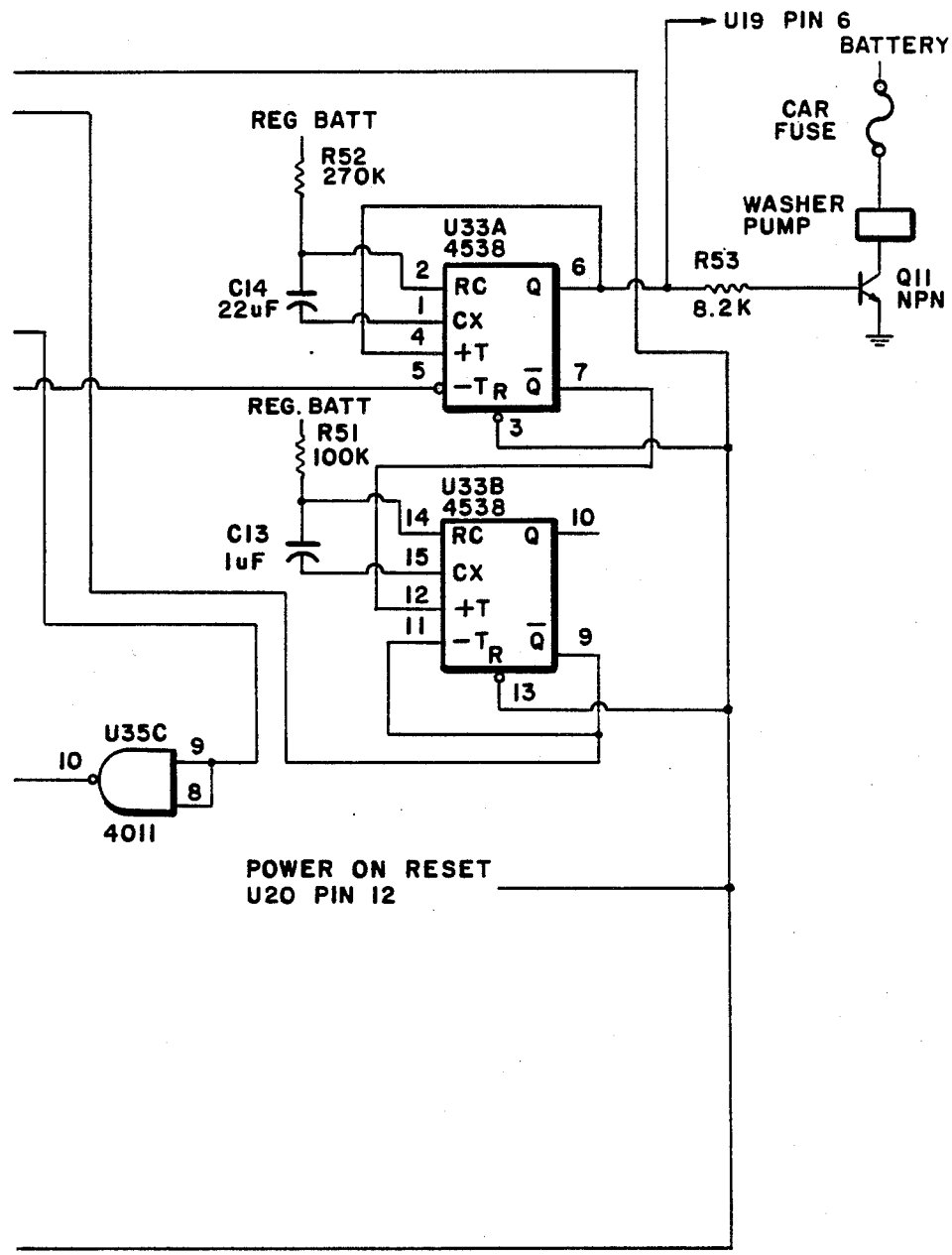

The impurities detection circuit of FIGS. 7 and 8 is useful in detecting moisture which contains certain impurities that would necessitate activation of the washer pump mechanism (standard on most cars). This feature can easily be included as an integral part of the wiper control circuit previously described.

The detection circuit works on the principle that moisture which contains impurities has a lower resistance value than pure rain or snow. Impurities are most likely to be present in moisture from backsplash (backspray). That is, moisture on the road surface picked up by tires, and then flung onto the windshield. This moisture mixes with road surface impurities such as oil, road salts, and dirt and can form a "slime" that can only be removed by washing them away by activating the window washer pump along with the windshield wipers. Moisture mixed with road salts (prevalent in the East) is especially easy to detect because the salt causes the resistance of the moisture to radically decrease (conductance increases).

Whenever backsplash occurs, it is logical to assume that a certain amount of oil will accompany it. The oil in the moisture is usually what necessitates the activation of the window washers and wipers, however it is the impurities present in the moisture (not the oil itself) that is detected by the circuitry.

The following is a description of the detection circuit.

The moisture sensor used in the window wiper control circuit can also be utilized to sense the aforementioned impurities (a second sensor is not needed).

Once impure moisture is detected, and in enough quantity to activate the wipers, wiper strokes are then counted. If the impure moisture is still present on the sensor after a given number of strokes, it is probably because the wipers cannot remove the moisture because of the impurities mixed with it (oil, dirt, road salts, etc). It is then that the washer pump, along with the wipers is activated. Wiper strokes may reach the predetermined number simply because impure moisture is still being "flung" onto the sensor (not because it cannot be removed). Activation of the washer pump is still beneficial in preventing a buildup of impurities.

If, on the other hand, the number of pre-determined strokes is not reached, the washer will not activate. A predetermined number of strokes while clean moisture is present will reset the number of dirty strokes to zero. The following is a detailed description of the circuitry:

Similar circuitry is used in the impurities detection circuit as is used in the drop discriminator circuit described above. Referring to FIG. 7, U30B and U30A comprise an amplifier and comparator circuit, respectively. Amplifier U30B, however, is used as a buffer (gain of 1) and comparator U30 has a threshold of approximately 5.2 V.

Rrain and R9 form a voltage divider. The voltage at pin 7 of U30B is dependent on the value of Rrain. An Rrain value of approximately 24.6 K or less would cause the voltage at U30B pin 7 to exceed the 5.2 V threshold, thereby producing a logical "0" at U30A pin 1. This logical "0" represents impure moisture present on the sensor. The "0" forces a "1" at the "D" input of flip flop U31A (impure moisture latch). This "1" is clocked over to the "Q" output of U31A thereby disabling clean moisture counter U32B and also enabling impure moisture counter U32A by way of 3-input OR gate U34A. The Q bar output of impure moisture latch U31A is a logic "0" at this time (since it is always the compliment of the Q output). The "0" is fed back to nand gate U35D pin 12 which forces a "1" to remain on the D input of U31A pin 5 thus latching a "1" to the Q output. The "1" will remain latched until a reset appears at pin 4 of U31A. If sufficient moisture is present on the sensor to activate the wipers, the wipers will activate wiper position sensor 1 at top of stroke. This produces a positive pulse at U35B pin 4, the negative edge of which clocks the enable impure moisture counter U32A pin 2. As the wipers move away from the top of their stroke, a negative edge is coupled over to U35C pin 9 thus producing a positive reset pulse at flip flop U31 pin 4 (impure moisture latch). If the impure moisture conditions still exist, a "1" will again enable impure moisture counter U32A. So, if and when the wipers reach the top of their stroke, U32A pin 2 receives a clock signal, thus causing the impure moisture counter U32A to count again (count now at decimal 2). Again, when wipers move away from the top of their stroke, a reset pulse appears at impure moisture latch U31 pin 4 (reset input).

It can be seen that, on a per-stroke-basis, the circuit evaluates whether or not impure moisture has fallen on the sensor. If it has, the number stored in the impure moisture counter U32A increases by 1 (if and when wipers reach the top of their stroke) until decimal 8 is reached (binary 1000). At this time, the Q3 output of U32A switches to "1", thus triggering monostable U33A to produce an output pulse, the duration of which is dependent on the RC time constant of R52 and C14 (approximately 6 seconds). This pulse, through R53 and Q11, turns on the washer pump. The pulse is sent to U19 pin 6 which ensures wiper activation for the pulse duration. At the end of the pulse, the monostable U33B is triggered, thus producing a reset to U32A (impure moisture counter) through 3-input OR gate U34B.

It can be seen that while impure moisture is present on the sensor, the impurities detection circuit produces a wash cycle ever eight wiper strokes.

Whenever the impure moisture counter (U32A) is enabled, the clean moisture counter (U32B) is disabled (the converse is also true). Therefore, while enough clean moisture is present on the sensor, the clean moisture counter U32B counts (increments 1 count) until decimal 4 is reached (binary 0100). At this time the Q2 output of U32B will switch to a "1", thus resetting, through 3-input OR gate U34B, impure moisture counter U32A. It is assumed that since clean moisture has been present on the sensor while the wipers have been stroking, that any impurities have been washed away and that the impure moisture counter U32A should be reset. This ensures that the impure moisture counter U32A must count 8 times (one count for each stroke) the next time impure moisture is present on the sensor. This prevents, for example, the impure moisture counter from having to count only twice to produce a washer cycle (assuming that a decimal 6, binary 0110, was already stored in the impure moisture counter). A full eight counts would be required to ensure that a "slime" build-up is actually present.

U34B pins 4 and 12 receive a power-on-reset pulse from U20 pin 13. U35C pin 8, U33A pin 3 and U33B pin 13 receive a power-on-reset "not" pulse from U20 pin 12. This ensures initialization of all impurities detection logic when battery power is first applied.

The same basic principle is utilized in the alternate detection circuit of FIG. 8 as was used in the detection circuit described above in connection with FIG. 7.

The impure moisture latch, U31 and nand gate U34A operate in the same way as described in the circuit of FIG. 7. Monostable U33A controls washer pump cycle on-time as before. Rrain, R9, U30B and U30A are not drawn on the schematic but are also used as described previously (input to U31 pin 3).

The main difference is that a 4 bit, binary, presettable, up-down counter (4516) is used instead of a dual binary up-counter (4520). A decimal count of 8 (binary 1000) is initially preset into the counter, U32, when a positive pulse appears at pin 1 of U32 (preset enable). A binary 1000 is preset because jam inputs P3 through P0 are hard-wired to 1000.

When impure moisture is present on the sensor, the Q bar output of impure moisture latch U31 is latched to a logical "0". This logic level, through nand gates U34C and U35B enable the up-down counter U32 to count down. Being enabled to count, it will actually only count when the wipers reach the top of their stroke, and wiper position sensor 1, through U35A, produces a positive clock edge at clock input U32 pin 15. Each time, as wipers move away from the top of their stroke, a negative edge is coupled over to U34B pin 6 by way of C1 and R50. This produces a reset pulse at U31 pin 4. This allows the detection circuit to re-evaluate whether or not impure moisture is present of the sensor. Each time the wipers reach the top of their stroke, while impure moisture is present on the sensor, U32 will count down until a count of zero is reached. When a count of zero is reached, carry out output pin 7 of U32 will switch to a logical "0" thus triggering the monostable U33A to produce a washer cycle by way of R53 and Q11. The output pulse that turns on the washers is also connected to U19 pin 6 (D input of the flip-flop that turns on the wipers) to ensure wiper operation during washer cycle.

At the end of the washer cycle, U33B is triggered to produce an output pulse, the duration of which is dependent on the RC time constant of R51 and C13. This pulse, through U34D, presets counter U32 back to a count of decimal 8 (binary 1000). Note that each time the counter is preset to 8, the counter can only count down (for the first count only) because the Q3 output of U32 is a "1" when an eight is preset (binary 1000). The logical "1" at the Q3 output forces, through U35C, U34C, and U35B, a "0" at the U/D (updown) input of U32.

When clean moisture is present on the sensor in enough quantity to cause wiper activation, U31A Q bar output will be a "1", which will enable U32 to count up (the counter will count up only when the count is not already 8).

It can therefore be seen that when impure moisture is present on the sensor, and the wipers are activated, the counter will count down to zero and produce a washer cycle. Also when clean moisture is present on the sensor and the wipers are activated, the counter will count up until a count of 8 is reached. The counter will then alternate between a count of 7 and 8.

Figure 9:
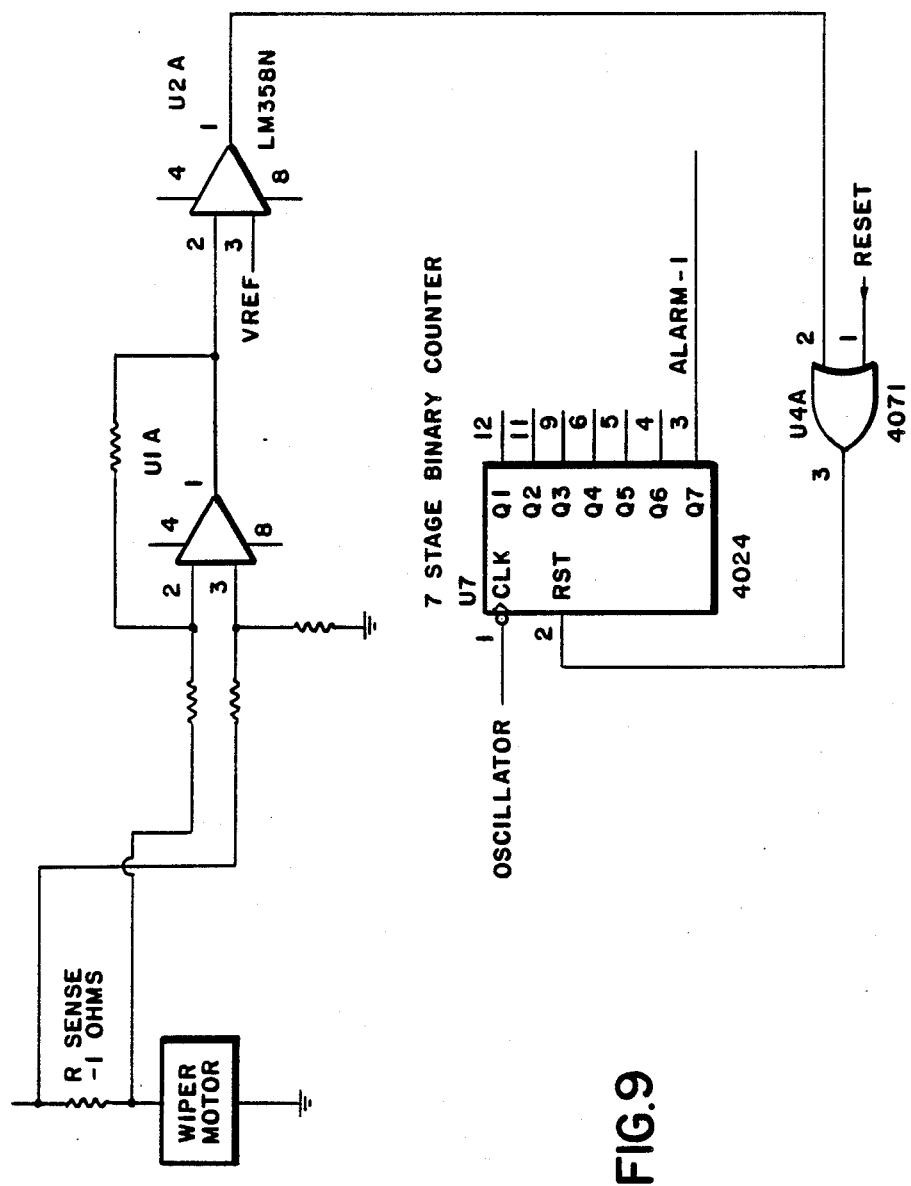
FIG. 9 is a schematic diagram of a windshield wiper ice alarm circuit which may be used with the present invention.

The ice alarm circuitry could alternatively be designed using the circuitry shown in FIG. 9. Motor current is maximum when the motor is prevented from moving. In this stall condition, the current through R sense causes an IxR voltage drop across R sense. This voltage is amplified by the differential amplifier U1. The output of amplifier U1 is compared to a voltage which represents the maximum allowable motor current. When this threshold is exceeded, comparator output U2 switches to a logical "0" which, through OR gate U4, removes the reset on binary counter U3. If the motor current is excessive, long enough, the Q6 output of U3 will switch to a logic "1" which represents the ICE ALARM condition. The binary counter is used somewhat like a filter. Transient current surges, which are normally present when the motor is initially activated, are ignored because they are not present long enough to allow the counter to count to a binary 1000000 (decimal 64) (Q6 output a logic "1"). A reset signal is periodically generated to reset binary counter U3 so that an erroneous ICE ALARM is not occasionally generated.

According to another feature of the present invention, the multi-strip moisture sensor is formed as a clear conductive coating on a transparent substrate, such as a glass windshield of an automobile. This clear conductive coating comprises a thin film of a composition selected from the group consisting of tin oxide ($SnO_2$:F) and indium tin oxide. The film can be produced by a number of well known methods, including spraying, sputtering and chemical vapor deposition. After application, this film is bonded to the substrate (e.g. glass windshield) and is in the order of up to 4,000 Angstroms thick.

The preferable clear conductive coating is a tin oxide film deposited by chemical vapor deposition. This film is transparent, highly conductive and exhibits high abrasion resistance over other formulations using the same or different method of application.

A primary advantage of the chemical vapor deposition method using a tin oxide film is that it lends itself easily to the manufacturing process of windshields. Because chemical vapor deposition is carried out at approximately 430° C. to promote the reaction, it is very easily applied to newly manufactured windshields.

The optical properties of a tin oxide film are excellent, providing clear vision through the windshield, and the resistivity is extremely low.

Indium tin oxide can be used to form another suitable thin film for application on a windshield. The preferred method of application of indium tin oxide is by sputtering.

Whereas chemical vapor deposition can be carried out through a mask to form the sensor strip pattern, sputtering must be employed to form a thin film on a localized area. In this case the film on this area must be subsequently selectively etched into the sensor pattern.

The methods of application of tin oxide thin films are known from the article "Properties of SnO$_2$:F Films Prepared on Glass Substrates by the Spraying Method" by G. Mavrodiev, M. Gajdardziska and N. Novkovski, *Electronics and Optics*"Thin Solid Films", 113 (1984) pp. 93–100. However, the use of such films to form conductors, and specifically a moisture sensor, on a motor vehicle windshield is not known heretofor.

There has thus been shown and described a novel moisture-responsive control system which fulfills all the objects and advantages sought therefor. Many changes, modifications, variations and other uses and applications of the subject invention will, however, become apparent to those skilled in the art after considering this specification and the accompanying drawings which discloses the preferred embodiment thereof. All such changes, modifications, variations and other uses and applications which do not depart from the spirit and scope of the invention are deemed to be covered by the invention which is limited only by the claims which follow.

What is claimed is:

1. An automatic control system for operating an electrically actuated device in response to the presence of water moisture, said control system comprising, in combination:
   (a) a voltage source;
   (b) a moisture sensor comprising a plurality of spaced apart, exposed conductive strips;
   (c) current detection means, having at least one input and at least one output, for producing a signal at an output when the current flow at an input exceeds a first prescribed threshold;
   (d) first means for connecting a first plurality of said conductive strips to said voltage source;
   (e) second means for connecting a second plurality of said conductive strips to said current detection means, each one of said second plurality being adjacent one of said first plurality of strips thereby defining adjacent pairs of sensor strips;
   (f) means, coupled to said current detection means, for switching on said device when the number of pairs of adjacent sensor strips, for which the current flow through each respective pair exceeds said first prescribed threshold, exceeds a second prescribed threshold;
   whereby a determination is made by said control system to operate said device, or to terminate its operation, in dependence upon the amount of moisture detected.

2. A control system in accordance with claim 1, ion which current detection means comprises a drop discriminator circuit which determines whether moisture between two adjacent sensor strips causes current flow therebetween which exceeds said first prescribed threshold.

3. A control system in accordance with claim 1, in which said switching means comprises a drop accumulation counter which makes a binary count of said number of pairs of adjacent sensor strips for which the current flow through each pair exceeds said first prescribed threshold.

4. A control system in accordance with claim 1, in which said switching means comprises a comparator for comparing with said second prescribed threshold said number of pairs of adjacent sensor strips for which the current flow through each pair exceeds said first prescribed threshold.

5. A control system in accordance with claim 1, in which said second connecting means includes a multiplexor coupled to said second plurality of said sensor strips for sequentially applying to said current detection means signals representing the current flow through pairs of adjacent sensor strips.

6. A control system in accordance with claim 3, in which said switching means includes a threshold register which stores a binary number representing said second prescribed threshold and in which said switching means includes a magnitude comparator for comparing the number in said drop accumulator counter with said second prescribed threshold number for switching on said device when the number in said drop accumulation counter is at least equal to the number in said threshold register.

7. A control system in accordance with claim 6, in which said switching means also includes a second threshold register which stores a binary number larger than said binary number representing said second prescribed threshold and in which said switching means includes a magnitude comparator for comparing the number in said drop accumulation counter with said larger binary number for switching on said device to a higher speed when the number in said drop accumulation counter is at least equal to the number in said second threshold register.

8. The control system in accordance with claim 1, in which said electrically actuated device is a window wiper system which is operable to move at least one wiper blade to and fro across a window for removing moisture.

9. The control system in accordance with claim 1, in which said second connecting means includes multiplexor means for coupling successive ones of said second plurality of strips to said current detection means.

10. A control system in accordance with claim 1, wherein said current detection means comprises a plurality of inputs connected to said second plurality of said conductive strips, whereby said current detection means is connected in parallel to said moisture sensor.

11. A control system in accordance with claim 10, wherein said current detection means further comprises summing means for determining the total number of pairs of adjacent sensor strips for which the current flow through each pair exceeds said first prescribed threshold.

12. A control system according to claim 11, wherein said summing means includes a voltage summing amplifier.

13. A control system in accordance with claim 1, wherein said current detection means comprises at least one Schmitt trigger circuit.

* * * * *